US009118164B1

(12) United States Patent
Newburgh (10) Patent No.: US 9,118,164 B1
(45) Date of Patent: Aug. 25, 2015

(54) COMPOSITE LASER GAIN MEDIUM (71) Applicant: U.S. Army Research Laboratory, Adelphi, MD (US)

(72) Inventor: George Alex Newburgh, Kensington, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/185,000

(22) Filed: Feb. 20, 2014

(51) Int. Cl.
H01S 3/30 (2006.01)
H01S 3/067 (2006.01)
H01S 3/16 (2006.01)
H01S 3/091 (2006.01)
H01S 3/06 (2006.01)

(52) U.S. Cl.
CPC ............. *H01S 3/067* (2013.01); *H01S 3/0619* (2013.01); *H01S 3/091* (2013.01); *H01S 3/161* (2013.01); *H01S 3/1608* (2013.01); *H01S 3/1616* (2013.01); *H01S 3/1618* (2013.01)

(58) Field of Classification Search
USPC .......................................... 372/6, 11, 69–70
See application file for complete search history.

(56) References Cited

U.S. PATENT DOCUMENTS

| 4,534,821 A | 8/1985 | Sakaguchi et al. |
| 4,974,230 A | 11/1990 | Hemmati |
| 5,291,501 A | 3/1994 | Hanna |
| 8,418,504 B2 | 4/2013 | Han et al. |
| 8,639,080 B2 | 1/2014 | Jiang |
| 2012/0327962 A1* | 12/2012 | Stultz ..................... 372/29.02 |

OTHER PUBLICATIONS

R. C. Stoneman and and L. Esterowitz, "Intracavity-pumped 2.09-,um Ho:YAG laser," Optics Letters, vol. 17, No. 10, May 15, 1992.
Jiaxin Wang, et al. "Theoretical Modelling of Thulium-sensitized Holmium Continuous-wave Fibre Lasers," Journal of Modern Optics, 1994, Vol. 41, No. 7, 1 457-1472.
Gunnar Rustad, et al., "Efficient single-transverse-mode laser-diode side-pumped thulium and holmium lasers—Modelling and experiment," OSA TOPS on Advanced Solid-State Lasers. 1996, vol. 1. Stephen A. Payne and Clifford Pollock (eds.), pp. 315-318.
S. So, et al., "Intra-cavity side-pumped Ho:YAG laser", Optics Express, 14, 22, 10481 (2012).
"Nufern Expands Tm and Ho-doped Fiber Product Lines," Nufern Press Release, dated Feb. 4, 2013 [available at: http://www.nufern.com/news/item/id/142/].
J. Li et al., "A 200W INNOSLAB Tm:YLF laser," Laser Phys. Lett. 10 (2013) 055002.

* cited by examiner

*Primary Examiner* — Dung Nguyen
(74) *Attorney, Agent, or Firm* — Eric Brett Compton (57) ABSTRACT

A composite laser gain medium is comprised of a first rare-earth element doped core; and a second rare-earth element doped cladding, at least partially, adjacent to the core. A portion of the lasing by the cladding at one wavelength within the composite laser gain medium is absorbed by the core so as to cause lasing of the core at a different wavelength. At least two distinct rare earth element pairs may be used in embodiments: (1) thulium (Tm) as a cladding rare-earth dopant and holmium (Ho) as the core rare-earth dopant; and (2) ytterbium (Yb) as a cladding rare-earth dopant and erbium (Er) as the core rare-earth dopant. Other rare earth element pairs are also believed possible. The laser composite gain medium may be configured to have a slab, or a cylindrical geometry.

19 Claims, 9 Drawing Sheets

FIG. 9

COMPOSITE LASER GAIN MEDIUM

GOVERNMENT INTEREST

Governmental Interest—The invention described herein may be manufactured, used and licensed by or for the U.S. Government.

FIELD

This application generally relates to lasers, and more particularly, to a composite laser gain medium.

BACKGROUND

Laser gain media are used in lasers. For example, both thulium-doped and holmium-doped lasers are important laser sources because they are considered "eyesafe," i.e., in the 2 µm spectral region, and have applications in remote sensing, and medical and military technology. Thulium has several favorable properties with respect to laser diode pumping, such as a strong absorption band at a diode emission wavelength around 785 nm and an efficient cross-relaxation process yielding two ions in the upper laser level per absorbed pump photon.

Some Tm—Ho lasers are comprised of two separate laser systems combined in series. However, the cost, bulk and complexity of such systems are relatively high, and flexibility of design options to tailor for different applications is limited. Other Tm—Ho lasers are formed of a co-doped holmium/thulium laser gain element where the co-doped laser gain element behaves as a single region.

However, it has been a challenge to obtain laser radiation of both good beam quality and high power.

BRIEF SUMMARY OF THE INVENTION

According to one embodiment, a composite laser gain medium is comprised of a first rare-earth element doped core, and a second rare-earth element doped cladding, at least partially, adjacent to the core. A portion of the lasing by the cladding at one wavelength within the composite laser gain medium is absorbed by the core so as to cause lasing of the core at a different wavelength.

The laser composite gain medium may be configured to have a slab, or cylindrical geometry. It may have a substantially uniform cross-section along its length. In some embodiments, in its cross-section, the cladding may fully surround the core along its length. And, in other embodiments, in its cross-section, the cladding may be adjacent to the core along its length on at least two sides thereof. The laser composite gain medium may further include an optical coating, such that, in its cross-section, the cladding is adjacent to one side of the core and the optical coating is adjacent to an opposite side of the core. In some instances, the core may be in direct contact, at least partially, with the cladding.

At least two distinct rare earth element pairs may be used in embodiments: (1) thulium (Tm) as a cladding rare-earth dopant and holmium (Ho) as the core rare-earth dopant; and (2) ytterbium (Yb) as a cladding rare-earth dopant and erbium (Er) as the core rare-earth dopant. Other rare earth element pairs though are also believed possible. The core may have a refractive index smaller, equal or larger than that of the cladding depending of the application. Also, the composite laser gain medium may include at least one optical coating formed on an end surface of the composite laser gain medium which is orientated perpendicular to the core and cladding. Additionally or alternatively, the composite laser gain medium may further include at least one optical coating formed on a side surface the composite laser gain medium which is orientated parallel to the core and cladding.

According to other embodiments, a laser includes the composite laser gain medium. The laser may include at least one source to output light to be received by the composite laser gain medium. Also, the laser may include at least one lens to focus the light output from the at least source onto the composite laser gain medium. In some instances, the laser may further include at least one optical coating formed on one or both of the opposed end surfaces the composite laser gain medium which are orientated perpendicular to the core and cladding of the composite laser gain medium. The laser may further include at least one mirror positioned exterior to an end surface of the composite laser gain medium. Depending on the application of the laser, the laser may be configured for: (a) optical side pumping; or (b) optical end pumping.

According to further embodiments, an optical amplifier includes the composite laser gain medium.

According to even further embodiments, an optical waveguide includes the composite laser gain medium. As a waveguide, (a) the core can be used as the waveguide; (b) a mirror can be provided external to one end surface of the composite laser gain medium; or (c) a pair of mirrors can be provided, one of said pair being provided external to each end surfaces of the composite laser gain medium.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 1 shows an exemplary schematic of composite laser gain medium according to an embodiment.

FIGS. 3-4 show exemplary embodiments of the composite laser gain medium.

FIG. 5 shows various optical configurations and methodologies may be used for controlling the output beam of the lasing core.

FIGS. 6-8 show various applications of the composite laser gain medium according to embodiments.

DETAILED DESCRIPTION

FIG. 1 shows an exemplary schematic of a composite laser gain medium 10 according to an embodiment. The composite laser gain medium 10 may be incorporated into a laser that can be used for generating and/or amplifying light which may be used for directed energy weapons, high power laser welding, and other applications requiring good beam quality. The laser wavelength may be useful to remote sensing and surgical laser based instruments, for instance.

Figure 1A:
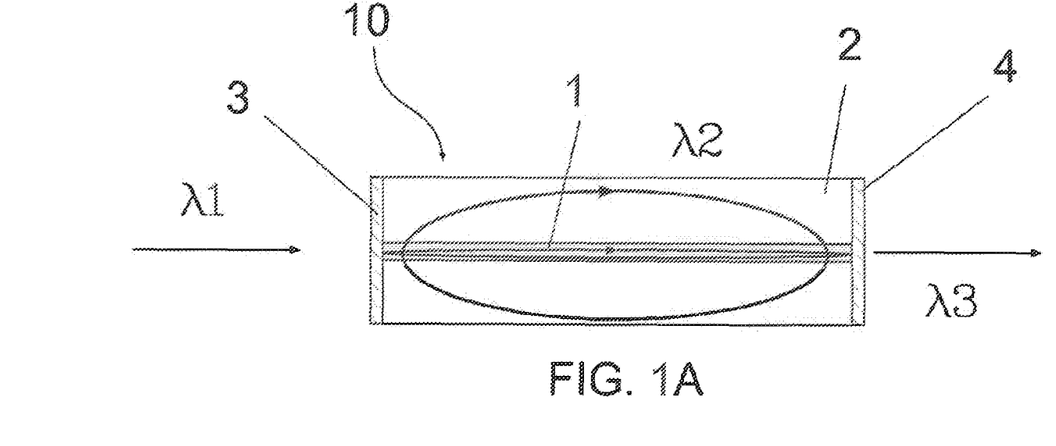
FIG. 1A shows the general operation of the composite laser gain medium.

FIG. 1A shows the general operation of composite laser gain medium when configured as a laser cavity. Looking from left-to-right, light of wavelength, $\lambda 1$ is directed into the composite laser gain medium 10. Light of wavelength $\lambda 1$ may be the output of an optical source (e.g., a laser diode or flash lamp). The composite laser gain medium 10 may be comprised of a core 1 doped with a rare earth element, and a cladding 2 doped with a rare earth element. Additionally, the laser gain medium 10 may include two mirror coatings 3, 4 formed on the two end faces of the medium as shown here; although, it will be appreciated that in other embodiments one or two external mirrors may be used instead as further explained below. Upon absorption by cladding of wavelength, $\lambda 1$, lasing at the wavelength, $\lambda 2$, commences and circulates within the gain composite boundaries as shown by the larger ellipse annotation. A fraction of the wavelength, $\lambda 2$, is absorbed by the composite core (darker rectangle in FIG. 1A), which in turn lases at wavelength, $\lambda 3$. And a fraction of wavelength, $\lambda 3$, is allowed to leave the laser cavity as drawn by the arrow exiting the composite gain medium on the right.

Figure 1B:
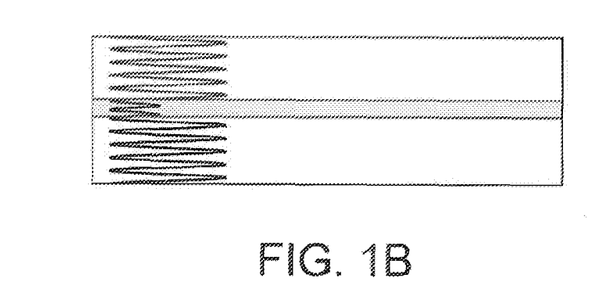
FIG. 1B shows the intensity distribution across the composite laser gain medium illustrated in FIG. 1A when operated.

FIG. 1B shows an example of an intensity distribution of one of the higher order multi-modes (e.g., a rectangular mode) across the composite laser gain medium 10 illustrated in FIG. 1A when operated. The gain medium 10 guides light in both the core 1 and the cladding 2 sections. It is noted that an appreciable fraction of the cladding lasing wavelength, $\lambda 2$, field's distribution spatially overlaps with the core 1 section. Consequently, a fraction of the lasing wavelength, $\lambda 2$, can be used to optically pump the core 1, which in turn lases at the wavelength, $\lambda 3$.

In general, the fraction of the lasing wavelength, $\lambda 2$-power present in core increases over the case where core and cladding have the same refractive index as the refractive index of the cladding becomes larger than that of the core and decreases as the core refractive index becomes larger than the cladding. Consider an example, in which the cladding 2 is 500 μm by 2000 μm and has a refractive index of 1.8 and the core 1 is 200 μm by 200 μm and has a refractive index of 1.78. The refractive index of the cladding here is larger than that of the core. The magnitude of an exemplary higher order mode is depicted in FIG. 1B indicating that an appreciable fraction of the cladding mode intensity is present in the core region of the gain medium. Summation of all cladding modes allowed in the gain medium demonstrates that the fraction of power which is contained in the core region is greater (in this case 7.7%) than the ratio of the core cross sectional area to the gain cross sectional area (4%).

According to various embodiments, at least two rare earth doped media may be used to form the composite laser gain medium 10. Both the core 1 and cladding 2 media include rare-earth element dopants impregnated or otherwise incorporated in solid-state host material. The dopants may include laser-active rare-earth elements and/or ions. In general, a first rare earth element used to dope the cladding 2 layer should emit at a wavelength of light that can be absorbed by the core 1 doped by a second rare-earth element. This arrangement enables a portion of the laser emission by the cladding layer to be absorbed by the core for the purpose of optically pumping the core 1 region. Optical pumping is the process in which light is used to raise (or "pump") the electrons from a lower energy level in an active laser medium to a higher one.

There may be a number of factors to consider for selecting the particular rare earth dopants for the core and cladding, respectively. In general, there are two primary criteria when choosing the rare earth dopants. The first criterion stipulates that the cladding dopant should emit as a laser at a wavelength that will be absorbed by the core. The second criterion stipulates that over the length of the composite gain medium, the cladding will absorb a great degree (e.g., 80-100%) of the diode pump source light while providing sufficient gain to lase the cladding. In other words, the absorption coefficient (which is roughly the product of the absorption cross section at the pumping source wavelength times the ion density), multiplied by the cladding length should be about 2 or greater. Likewise, the core should be of sufficient absorption, such that, at the cladding lasing wavelength $\lambda 2$, the product of the absorption cross section at the cladding emission wavelength multiplied by the ion density, multiplied by the cladding length, is about 2 or greater.

The inventor has determined at least two distinct rare earth element pairs may be used in embodiments of the invention which meet the aforementioned criteria. These include: (1) thulium (Tm) as a cladding rare-earth dopant and holmium (Ho) as the core rare-earth dopant; and (2) ytterbium (Yb) as a cladding rare-earth dopant and erbium (Er) as the core rare-earth dopant. Other rare earth element pairs are also believed possible.

In general, there are two classes of host material available for use in designing the core 1 and cladding 2 of the composite laser gain medium 10: crystalline or glass materials. In keeping with convention, weight percentage (wt. %) is generally used when describing the dopant concentration is a glass matrix, and atomic percentage (at. %) is generally used when describing a crystalline matrix.

A rare-earth doped crystalline host medium generally possesses larger absorption and emission cross-sections and greater thermal conductivity than the same rare earth in a glass host. There are various methods of growing rare-earth doped laser crystals, such as: The Czochralski (CZ), Temperature Gradient (TGT), heat Exchanger, Vertical and Horizontal Bridgman, Laser—Heated pedestal Growth and Flux Techniques. The CZ techniques being the most common, uses a Radio—Frequency heated crucible to melt a mixture of rare-earth and laser host components comprising yttrium aluminium garnet or YAG ($Y_3Al_5O_{12}$), alumina ($Al_2O_3$) or yttrium orthovanadate ($YVO_4$), for example. A seed crystal is then placed in the melt and slowly drawn from liquid under rotation to produce a rare-earth-doped laser crystal. See, e.g., U.S. Pat. No. 4,534,821, herein incorporated by reference in its entirety.

Greater absorption and emission cross sections allow for a shorter length of gain medium (e.g., less than about 10 mm). While shorter gain lengths of the rare earth doped crystal results in a proportional increase in the concentration of heat deposition in the gain medium, the crystal host's greater thermal conductivity (e.g., greater than about 5 times that of glass) can be used to cool more effectively.

On the other hand, a glass host has the advantage of allowing for production of long lengths of gain medium and when drawn in the form of an optical fiber which can be used to waveguide all of the optical wavelengths, λ1, λ2 and λ3 used in production of the laser. Some common glass host materials for the rare-earth ion dopants may include silicate, phosphate, fluoride, germanate and fluorozirconate, for example. There are two primary methods of manufacturing a doped glass media: 1) deposition of a chloride based soot into a un-doped glass rod, commonly referred to as vapor axial deposition after which the rod is subjected to a rare-earth/chloride vapor or solution and then sintered; and 2) deposition a chloride based soot on the inside walls of an un-doped glass tube which is subjected to rare-earth doped vapor or solution. See, e.g., U.S. Pat. No. 8,418,504, herein incorporated by reference in its entirety.

In some embodiments, the laser gain medium 10 may be formed to be about 20 to 50 mm long and 0.5 to 5 mm wide, and 0.5 mm to 2 mm thick, with the core 1 measuring 20 to 1000 μms wide and 20 to 500 μms thick, and the cladding 2 measuring 0.5 to 5 mm wide to 0.5 mm to 2 mm thick. If a glass host medium is used, the length dimension may be multiplied by a factor of 10 or greater.

Table I, below, shows exemplary lasing wavelengths for these two rare earth element pairs. For example, in the case of a Tm doped YAG clad, the laser will absorb at about 0.8 μm and emit at 2.013 μm a wavelength which is absorbed by Ho:YAG core (emitting at 2.097 μm). For a choice of Yb and Er as a rare earth pair, Yb doped silicate (emitting at 0.98 μm) may be used to pump the Er silicate core (absorbing at 0.98 μm and emitting at 1.53 μm). Of course, it should be appreciated that the exact lasing wavelengths values for these pairs can vary from what is noted in this table based on specific dopant concentrations, host material selection, and/or contaminants, for instance.

TABLE I

|  | λ1 (μm) | λ2 (μm) | λ3 (μm) |
|---|---|---|---|
| Tm-clad/Ho-core | 0.8 | 2.013 | 2.097 |
| Yb-clad/Er-core | 0.915 | 0.98 | 1.53 |

The cladding 2 is designed to lase at the wavelength λ2 which is capable of optically pumping the core 1. In the case of a Tm clad/Ho core laser crystal laser, a 3% Tm (by concentration) doping of a YAG clad in combination with a 10% Ho (by concentration) doping of a YAG core may be used for efficient operation of the laser. Over a 25 mm laser gain length using end pumping, a 3% doping of Tm results in nearly complete absorption of the 785 nm pump light for conversion into 2013 nm radiation. A 10% Ho doping of the core, results in strong absorption of the 2013 nm laser radiation produced by the Tm clad laser over the 25 mm length given a 5-10% core-to-clad cross section area. For the case of a 785 nm side pumped 5 mm wide laser, the Tm doping would be increased to 10-15%.

Figure 2:
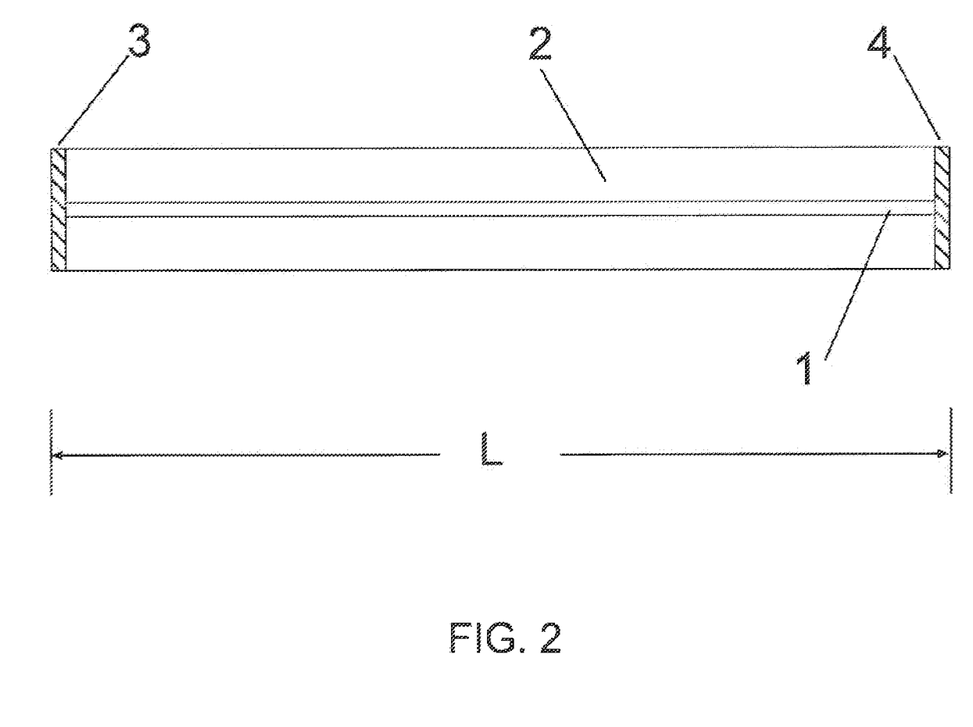
FIG. 2 is an enlarged side view of the composite laser gain medium according to an embodiment.

FIG. 2 is an enlarged side view of the composite laser gain medium 10 along its length. The solid-state composite laser gain medium 10 is formed of the core 1 and the cladding 2, having a length L and generally uniform cross-section along its length. Although, it is conceivable that the cross-sectional shape of might vary along its length in keeping with the scope of the invention.

The core 1 and the cladding 2 are arranged such that the cladding 2 is, at least partially, adjacent to the core 1. More particularly, the core may be in direct contact, at least partially, with the cladding in some embodiments. For example, as shown, the core 1 and the cladding 2 are discrete layers bordering one another, along the length of the composite laser gain medium 10 with an interface formed at their points of contact. It is possible, though, to have additional layer(s), such as an adhesive, interposed between the core 1 and cladding 2 in other embodiments which are substantially transparent to the lasing light and do not affect lasing. For example, a layer of material having a refractive index nearly identical to either the core 1 or cladding 2 could be incorporated into the composite laser gain medium 10.

When the composite laser gain medium 10 is assembled, the core 1 may be bonded to the cladding 2, with or without a separate adhesive, for example. In some instances, an optical contact bonding process may be used without any adhesive, such that the surfaces thereof are joined together only by intermolecular forces. A high temperature fusion process might also be used. If an extrusion process is used to form the composite laser gain medium 10 (such as a high temperature drawing process, for example, typically used in glass fiber formation), the core 1 and cladding 2 can be fused through the high temperature pulling. It is also possible that the composite laser gain medium 10 could be formed using a single host material (e.g., a crystalline or glass material), in which and the core 1 and cladding 2 are distinct regions thereof, with each region being formed in the host material by a separate diffusion or implantation process. The term "composite," as used herein, thus should not be construed as being limited to separate and/or discrete elements.

The end surfaces, as illustrated in FIG. 2, are generally perpendicular to the core 1 and cladding 2. As shown, first and second optical coatings 3 and 4 may be formed on the end surfaces of the laser gain medium 10 in some embodiments. The first and second optical coatings 3 and 4 (when present) may be anti-reflective (AR), highly reflective (HR), partially reflective (PR) and/or transparent to different wavelengths of light depending of a particular laser application.

Figure 3A:
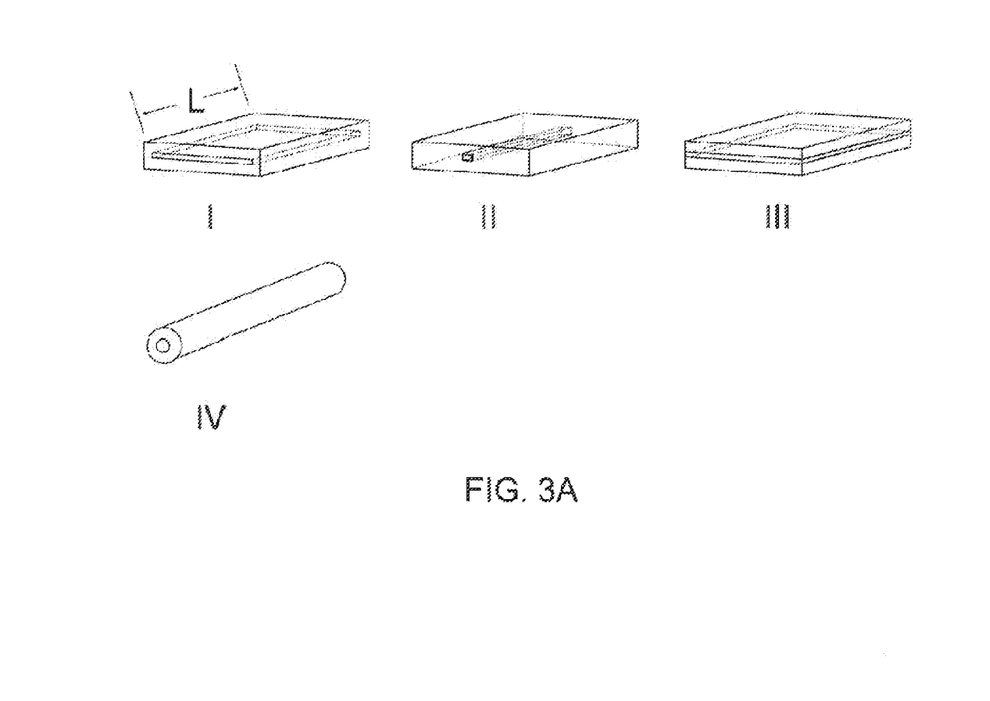
FIG. 3A shows various slab embodiments and a cylindrical embodiment of the composite laser gain medium.

FIGS. 3-4 show exemplary embodiments of the composite laser gain medium. FIG. 3A shows various slab embodiments and a cylindrical embodiment of the composite laser gain medium 10. The term "slab" as used herein generally refers to the thick flat shape. In embodiments I and II, first described, the composite laser gain medium 10 is configured as a slab where the composite laser gain medium 10 is formed with the cladding 2 fully surrounding the core 1 along its length. The embodiments, however, illustrate that the cross-sectional core-to-clad area ratio may be very different.

In the first embodiment I, the core 1 has generally a rectangular-shape, whereas in the second embodiment II, the core 1 has generally a square-shape. The large cross-sectional core-to clad ratio (e.g., greater than about 10%) in the first embodiment I results in a like ratio of overlap of the cladding mode radiation with the core region. While the composite laser gain medium 10 shown here is illustrated in a cross-sectional rectangular configuration, it should be appreciated that composite laser gain medium can be formed in various other configurations, such as in an annular (or ring-like) or even in an irregular shape configuration. The overlap of the cladding radiation with the core is experienced as an intracavity loss by the cladding laser due to absorption by the core. This configuration allows for a large fraction of the laser light generated by the cladding to optically pump the core in proportion of the ratio of core cross sectional area to slab cross sectional. As the core-to-gain cross sectional area is large (e.g., greater than 0.1), a large fraction of the cladding power may be absorbed. This configuration could be used where 1) the importance of output power and efficiency of the laser is primary, 2) the quality of the laser output is secondary, and/or 3) where the cladding laser operates most efficiently with at least 10% of the cladding power being absorbed by the core.

The second embodiment II illustrates the case where a low cross-sectional core-to-clad area ratio limits the transfer of cladding pump power to core. The core is much smaller (e.g., less than 10%) in cross-sectional than of the first embodiment I. Here, the core 1 is illustrated as having a generally square-shape; however, the cross-sectional shape should not be thought of as limiting. This configuration may be used if the cladding laser operates best with a low (less than 10%) optical loss and/or if design requires a small core for single or low order mode lasing of the core. For instance, the low core-to-clad area ratio can be used in the case where the core is used as a waveguide of single mode radiation in which case the core could have a transverse dimension of about 10-20 µm.

The third embodiment III shows another slab arrangement of the composite laser gain medium. This slab here includes cladding layers formed above and below the core only (resembling a sandwich of layers of cladding, core and cladding), unlike the slab embodiments I and II in which the core is fully surrounded by cladding as viewed along its length. This configuration may be easier to construct due to the reduced number of bonded surfaces. However, the output beam quality at lasing wavelength, $\lambda 2$, may be inferior to that of first embodiment I as a larger number of transverse lasing modes exist due to the larger refractive index contrast at the core/air interface.

The fourth embodiment IV is a cylindrically symmetric arrangement of core and clad. This geometrical arrangement could be used for manufacture of a glass based fiber laser, such as a large mode area (LMA) fiber laser. The same criteria as outlined above may be used for the choice of the core-to clad ratio. For the case of a Tm-clad/Ho-core fiber laser, where the core is of diameter of 20 µm, the cladding is 200 µm in diameter, a 0.25 wt % Tm doping of a silicate clad in combination with a 1 wt % Ho doping of a silicate core could be used for efficient operation of the laser, for example. Over a 200 mm long laser gain length, a 0.25 wt % doping of Tm results in near complete absorption of the 785 nm pump light for conversion into 2013 nm radiation. A 1 wt % Ho doping of the core results in strong absorption of the 2013 nm laser radiation produced by the Tm clad laser over the 200 mm length, given a 1% core-to-clad cross section area.

Figure 3B:
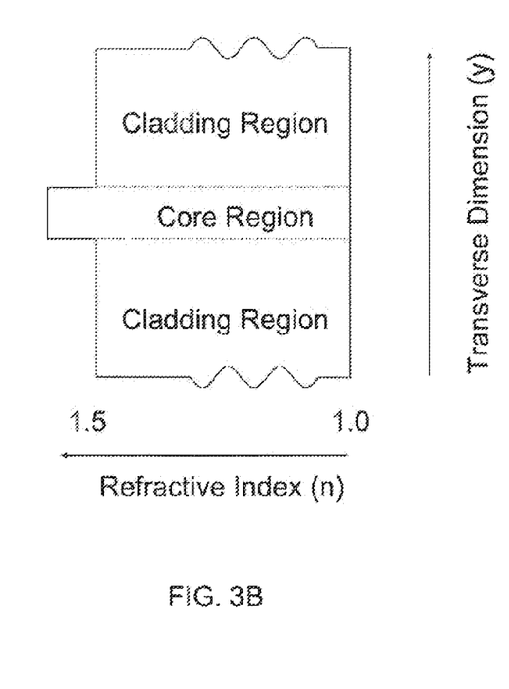
FIG. 3B shows the refractive index profile of the composite laser gain medium embodiments shown in FIG. 3A.

FIG. 3B shows the refractive index profile of the composite laser gain medium embodiments I-IV shown in FIG. 3A. The horizontal axis corresponds to the magnitude of the refractive index. The sinusoidal sections in this figure indicate a large offset from a base value of 1.0 to the refractive index of the gain media which varies, typically, from 1.5-2. For reference, the refractive index of air is approximately 1.0. The central peak represents the refractive index of the core and the next lower level with the cladding. The difference between the high central peak for the core and the lower levels for the cladding can be very small for waveguiding. For instance, the difference in the two values can range from as little as −0.05 to 0.05. The vertical axis represents a distance taken through the middle of the composite gain medium.

Figure 4A:
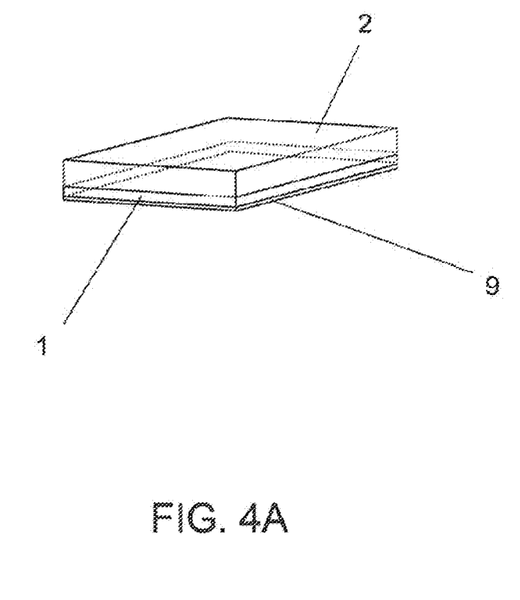
FIG. 4A shows another slab embodiment of the composite laser gain medium.

FIG. 4A shows yet another slab embodiment V of the composite laser gain medium. Unlike the previous embodiments, where the cladding is formed at least above and below the core, in embodiment V, a single cladding 2 is formed on top of the core 1 and an optical coating 9 is formed on the unbounded bottom surface of the core 1 opposite to the cladding 2. The optical coating 9, such as $Al_2O_3$ having a thickness of at least 20 µm, can enable waveguiding of the Tm cladding layer as the refractive index of $Al_2O_3$ (approximately 1.75) is much closer to Tm:YAG (approximately 1.8). Deposition of subsequent layers of Ti/Pt/Au (500 Å/600 Å/1000 Å) may also enable soldering of the slab to a heat sink. (It is noted that deposition of the optical coating may be required, in some cases, as Ti has a refractive index of 3.3, a value which could inhibit waveguiding of light in the cladding layer).

Figure 4B:
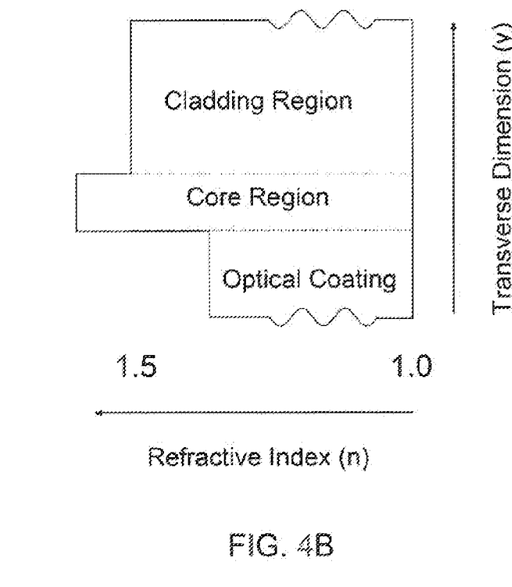
FIG. 4B shows the refractive index profile of the composite laser gain medium embodiment shown in FIG. 4A.

FIG. 4B shows the refractive index profile of the composite laser gain medium embodiment V shown in FIG. 4A. The optical coating 9 has index of refraction less than the refractive index of the core layer for reduction of the number of modes. In some instances, an additional metal layer may be further formed or deposited on the bottom of the optical coating to enable soldering of the composite gain medium to a heat sink. The top layer, i.e., the cladding layer, has the largest cross-sectional area of the composite laser gain medium.

In general, a slab (e.g., embodiments I-III and V) of the composite laser gain medium may likely be superior from the point of view of thermal management to a cylindrical geometry (e.g., embodiment IV) as it may be formed into a ribbon-like format to have a larger surface area-to-volume ratio than the cylindrical geometry enabling more efficient cooling if the surface of the gain medium is placed in contact with a cooling medium. The thermal management characteristics may be enhanced if the clad/core dimensions are made to have a large width to height ratio, ribbon-like, whereby heat extraction rates are maximized when the ribbon is placed in contact with a cool, thermally conducting surface. If a core dimension is kept small (e.g., in the low 10's of µm range), output beam quality in that direction will be very good. A slab laser could be used for the power scaling of remote sensing and directed energy systems for a wide range of potential applications ranging from the weapons systems, surgical lasers, remote atmospheric sensing, eye-safe welding and high average power directed energy applications.

While slab and cylindrical geometrical configurations for the composite laser gain medium have been shown, it will be appreciated that other geometrical configurations might also be possible in keeping with the scope of the invention.

Figure 5A:
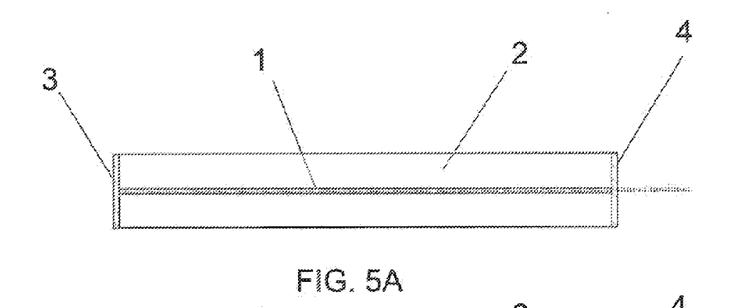
FIG. 5A shows the core used as a waveguide.

Various optical configurations and methodologies may be used for controlling the output beam of the lasing core, three of which are illustrated in FIG. 5. In a first method, illustrated in FIG. 5A, the core 1 is configured for use as a waveguide in which lasing of the core 1 at the wavelength $\lambda 3$ will substantially be confined within the core 1 between optical coating 3, 4 provided on the end surfaces. This requires that the refractive index of the core be greater than the refractive index of the cladding. That is, the difference in refractive index, $\Delta n = n_{core} - n_{cladding} > 0$. The required magnitude of $\Delta n$ is determined by the desired beam quality, $M^2$, of the core waveguide and the transverse dimension of the core according to the formula, $M^2 = (4a/\lambda * NA)/M^2 \approx 4*a/\lambda * NA$ where a is the transverse dimension of the waveguide, $NA = \sqrt{n_{core}^2 - n_{cladding}^2}$ the numerical aperture of the core/cladding and $\lambda$ the wavelength of light. For example, for a 20 µm core designed to waveguide 2 µm light as a single mode ($M^2 = 1$), $\Delta n = 0.00014$ based on $n_{cladding} = 1.8$, which is the refractive index of YAG, For effective transfer of the lasing clad radiation to the core, the ratio of the core to cladding area may be at least 4%, for instance, which implies a slab of about 100 microns on a side. It should be mentioned that under lasing operation, the core region of the slab may be at a higher temperature than the cladding due to its distance from the cooling surface in contact with the gain surfaces. As the refractive index of glass and most crystals increases with temperature (dn/dt>0), $\Delta n$ will be larger than under non-operational laser conditions thereby increasing the NA and reducing the beam quality of the core emission. However, if mode quality is of secondary importance, the core and slab transverse dimensions may be scaled without limit. For the case when the refractive index of the core is slightly larger (e.g., Δn=0.02) than the cladding, light propagating in the composite gain medium is highly multi-mode. Calculation of the fraction of light power which is located in the core is simply the ratio of the core to composite cross sectional area. For example, for the instance where the core measures 400 μm by 400 μm and the composite gain element measures 1 mm by 2 mm, the fraction of power residing in the core is about 8%.

The optical coatings 3, 4 form an optical resonator about the gain medium. The first coating 3 may be an anti-reflective coating (e.g., >95% transmissive) for the pump wavelength 790 nm while being coated for high reflectivity (e.g., >99.5%) at the Tm and Ho lasing wavelengths of 2 μm and 2.1 μm. The second coating 4 may have a high reflectivity (e.g., >99.5%) at the Tm lasing wavelength of 2 μm and may be optically coated for partial reflectivity (e.g., 80-95%) for the Ho lasing wavelength at 2.1 μm.

Where a laser of beam quality, $M^2$ of approximately 25 may be desired, a Tm-clad/Ho-core composite laser gain medium could measure 25 mm in length, 5 mm in width and 1 mm in height with the Ho core dimension measuring 25 mm in length, 0.4 mm in width and 0.4 mm in height. Based on a Tm:YAG clad refractive index of Δn=−0.001 with respect to the Ho:YAG core waveguide (NA=0.06), the number of transverse modes, m, in the height and width directions are; $m_w = (w/\lambda)*NA=12$, $m_h=(h/\lambda)*NA=12$. As the $M^2$ value of a rectangular waveguide can be calculated as $M^2=2*m+1$, the laser will emit 2.1 μm radiation with an $M^2_x=M^2_y=25$. The wavelength range is determined by the stronger emission peaks of the Ho rare earth/crystal host configuration. In the case of a Ho-glass host configuration, some tunability of the 2.1 μm emission is possible. However, the laser beam quality could worsen with increasingly numerical aperture and especially as the core dimensions surpass 10-20 times the wavelength λ3.

Figure 5B:
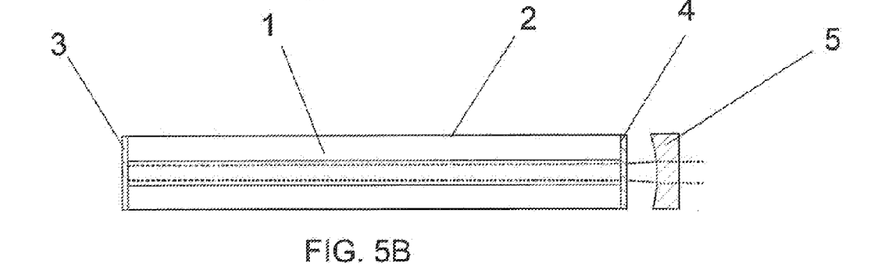
FIG. 5B shows an external concave mirror.

In another method, illustrated in FIG. 5B, an external concave mirror can be used whether the cladding is of equal or higher refractive index than the core. In this situation, because some of the lasing of the cladding 2 at the wavelength λ2 will inherently stray into the core 1 between optical coatings 3, 4, the laser cavity mirror 5 is used to make a stable optical cavity mode for λ3. In this configuration, first optical coating 3 may be AR coated for the pump wavelength of 790 nm and HR coated for the wavelength range 2.0-2.1 μm. The second optical surface 4 may be AR coated for the wavelength range 2.0-2.1 μm while optical surface of mirror 5 may be HR coated for the Tm lasing wavelength of 2 μm and partially reflective coated for the Ho lasing wavelength of 2.1 μm The use of the external mirror 5 allows for the generation of single mode laser mode output with a core of transverse dimensions in the 100's of micrometers. A larger core allows for a larger core-to-cladding area ratio and a proportional increase in pump power of the core. As the external mirror is responsible for confinement of the core laser mode, the refractive indices of the cladding and core may be of secondary importance.

Figure 5C:
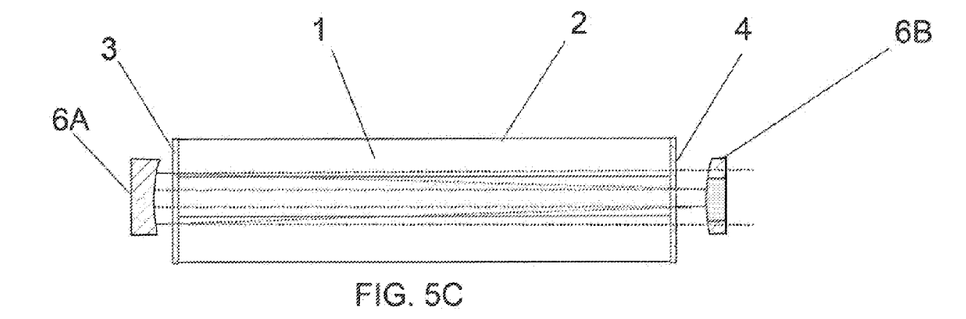
FIG. 5C shows a concave—convex mirror pair placed external to the composite laser gain medium.

In yet another method, illustrated in FIG. 5C, a concave—convex mirror pair 6A, 6B placed external to the composite laser gain medium 10 can also be used whether the cladding is of equal of higher refractive index that the core. Because some of the lasing of the cladding 2 at the wavelength λ2 will inherently stray into the core 1 between optical coatings 3, 4, in this situation, the pair of mirrors 6A, 6B is used to redirect stray light back into the core 1 to maintain optical confinement. As shown, the mirror pair includes the concave mirror 6A and the convex mirror 6B. Mirror 6B may be gradient mirror, for instance. This configuration serves to build an unstable laser cavity for energy extraction from a large dimensioned core. The unstable laser cavity configuration also has the advantage of allowing for a large fraction of the cladding power to be absorbed while yielding good output beam quality.

The optical surface of the concave mirror 6A may be HR coated for the lasing wavelengths λ2 and λ3, and AR coated for the pumping wavelength λ1, while the convex mirror 6B may be optically coated at its center for the lasing wavelength λ3 and AR coated at λ3 outside the center. In this configuration, both the first and second optical coatings 3 and 4 may be AR coated for the wavelength range 2.0-2.1 μm. This configuration may allow for lasing of the core of transverse dimensions greater than a 1 mm in size while maintaining good output beam quality.

Figure 6:
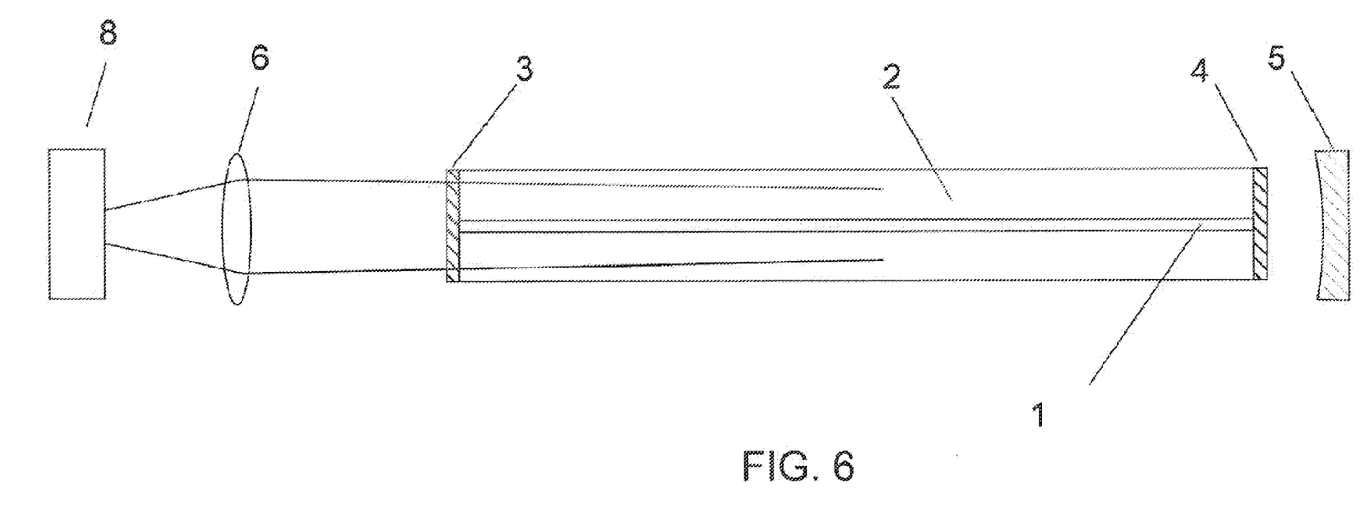
FIG. 6 shows the composite laser gain medium being optically end pumped.
Figure 7:
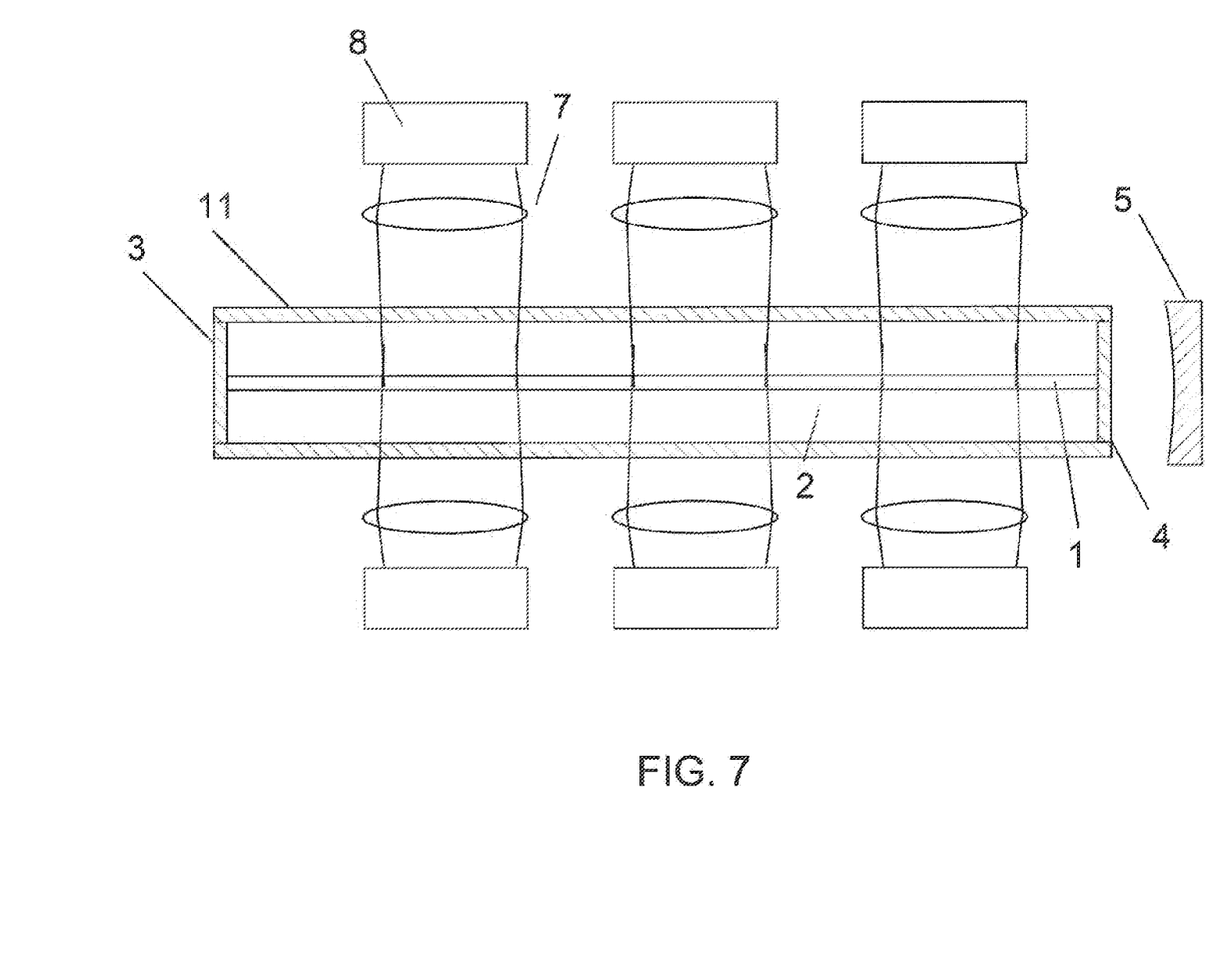
FIG. 7 shows the composite laser gain medium being optically side pumped.
Figure 8:
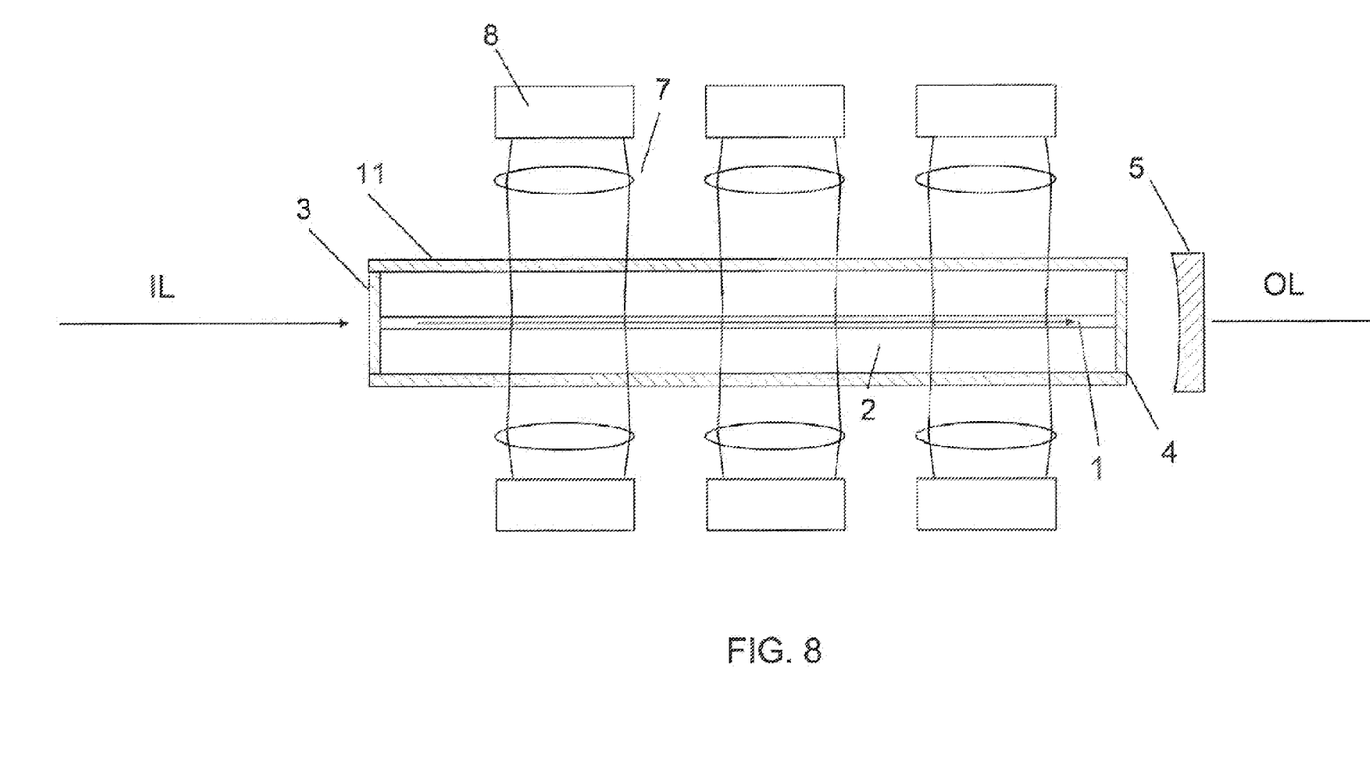
FIG. 8 shows use of the composite laser gain medium for the optical amplification.

FIGS. 6-8 show various applications of the composite laser gain medium 10 according to embodiments. FIG. 6 shows an end pumped composite gain medium 10 operated as a laser. Here, the composite laser gain medium 10 is pumped by a light source 8, such as a flash bulb or a laser diode. The light output from the light source 8 may be focused onto the composite laser gain medium 10 by an optional lens 6. If a greater amount of end pumping power is required, multiple sources could be focused into the composite laser gain medium. Each additional source would be focused at an angle different from the others (i.e., angle multiplexing).

In one example, the laser cavity includes a laser gain medium that uses a singly doped Tm cladding 2 to pump a singly doped Ho core 1. A fraction of the Tm radiation is absorbed by the small and single moded Ho core 1. Here, the light source 8 could be configured to emit light having a wavelength of approximately 785 nm. The Tm/Ho composite laser gain medium 10 uses the 785 nm optical pumping of a Tm doped cladding 2 to produce 2.0 μm light through laser action.

More particularly, the Tm doped cladding 2 medium absorbs the optical pump source light and produces laser emission at 2.0 μm resulting from laser oscillation between the high reflectivity optical coating at 2.0 μm of the first coating 3 and the mirror 5. As the 2.0 μm radiation circulates in the laser cavity, a fraction of the 2.0 μm laser radiation is absorbed by the Ho doped core. Consequently, the 2.0 μm, multimode, radiation optically pumps the Ho doped core 1 through a partial overlap of its numerous cladding modes with the Ho doped core. As the Ho doped gain medium absorbs the 2.0 μm laser radiation, it in turn, emits radiation at 2.1 μm which results in laser oscillation between the high reflectivity optical coating at 2.0-2.1 μm of the first optical coating 3 and the partially reflectively coated mirror 5. Because the mirror 5 is concave, single mode 2.1 μm radiation is produced if the Fresnel number of the laser cavity is less than 1. If the Ho layer is narrow (i.e., approximately 20 μm) in one dimension, the 2.1 μm radiation is of very good beam quality in the narrow transverse dimension.

The first and second optical coatings 3 and 4 may be optical coatings configured to substantially transmit light (i.e., without significant reflection) in the wavelength range 2.0-2.1 μm. The first optical coating 3 may be a highly reflective optical coating configured to substantially reflect light having a wavelength between about 2.0-2.1 μm. However, the first optical coating 3 may be transparent to light of the first wavelength λ1 to permit light from the diode laser 8 to enter the laser gain medium 10. The second optical coating 4 may be a dichroic optical coating which is configured to be highly reflective to light having a wavelength of about 2.0-2.0 μm, and to be partially reflective to light having a wavelength of about 2.1 μm. Depending on the dimensions of core to clad, the partial reflective 2.1 μm optical coating can range from about 85% to 99%.

A mirror 5 may be located exterior to the second optical coating 4, with coating 4 designed to be AR coated for the wavelength range of 2.0-2.1 μm. The mirror 5 may be formed to reflect at a lasing wavelength of Tm of 2.0 μm and partially reflective at the Ho lasing wavelength of 2.1 μm. More particularly, the first mirror 5 may be a dichroic optical coating configured to be highly reflective and substantially reflect light having a wavelength of about 2.0 μm, and to be partially reflective to light having a wavelength of about 2.0-2.1 μm.

If greater simplification of the embodiment of FIG. 6 were required, mirror 5 could be eliminated by replacing the optical coating of coating 4 with a high reflective coating at 2.0 μm and partially reflective at 2.1 μm. However, unless the core is designed to be waveguiding (refractive index of the core larger than the cladding) with small transverse dimensions (e.g., less than about 20 μm), single mode operation of the 2.1 μm might not be assured.

FIG. 7 shows the composite laser gain medium 10 being optically side pumped. This embodiment may be configured for higher power generation. A series of light source 8 can be used here to side pump the composite laser gain medium 10 along the length dimension of the composite. In some instances, the side surface(s) of the composite laser gain medium 10 may include an outer coating 11 orientated parallel to the interface of the core and cladding, such as an AR coating for the pump wavelength, e.g., 0.8 μm.

While it is desirable to distribute the pump light as evenly as possible, in some cases pumping the composite slab on one side only may be acceptable. The light source 8 may be configured to output light having a wavelength of about 785 nm, for instance, which can be focused onto the composite laser gain medium 10 by corresponding lenses 7. Efficient absorption of the pump light as collimated by lens 7 will occur if the cladding-doping concentration is sufficient such that absorption coefficient multiplied by the pumping transverse direction is 2 or greater.

In one example, the composite laser gain medium 10 may be formed of a thulium doped matrix 2 such as YAG crystal or silicate glass and of holium doped core matrix 1 such as YAG crystal or silicate glass, that is optically pumped by at 790 nm by series of diode laser optical pump sources 8 whose light is focused by lenses 7 into the composite laser gain medium 10. The optical coating 3 and the mirror 5 forms an optical resonator about the composite laser gain medium.

The optical coating 3 may be highly reflectivity (e.g., >99.5%) optically coated at the Tm and Ho lasing wavelength 2 of 2-2.1 μm. The other optical coating 4 is AR coated (e.g., >95%) at the Tm and Ho lasing wavelengths of 2.0-2.1 μm. The laser cavity mirror 5 is optically coated to be transmissive (e.g., >95%) to optical pump of 790 nm and high reflective (e.g., >99%) to the lasing wavelength at 2.1 μm. The laser cavity mirror 5 is optically coated for partial reflectivity (e.g., 80-95%) for the Ho lasing wavelength at 2.1 μm.

End pumping of the composite gain medium may be more advantageous than side pumping, in some instances, for example, if only a single, relatively low pump power source is available and the cladding measures 1 mm by mm or less. For applications where many hundreds of watts or more of 0.8 μm pump power is required, then side pumping may be preferable due to the ease of distributing the pump power more evenly over the composite gain body. If the mirror 5 is not used, the composite medium surfaces could be optically coated and configured to form a plane-parallel, confocal, hemispherical or concave-convex laser cavity.

FIG. 8 shows use of the composite laser gain medium for the optical amplification. In one embodiment, the thulium clad, holmium core composite laser gain medium may be used as an optical amplifier, such as, for 2.1 μm radiation. For instance, input light IL (such as from the a Ho:YAG laser) may be injected into the composite laser gain medium 10 as shown in the figure while the composite laser gain medium is optically pumped by optical sources 8. The diode radiation is focused by a lens 7 or lens pair into the laser gain composite medium. Under appropriately strong pumping conditions, e.g., 0.8 μm for a thulium-doped clad/holmium-doped core, the 2.1 μm 517-518 transition level becomes inverted. The input light at is thereby amplified as it passes through the population inverted region. The output light OL exits the amplifier.

The optical coating 11 may be anti reflective (e.g, >95% transmissive) for the pump wavelength. The optical coatings 3 and 4 may be reflective (e.g., >95% transmissive) at the core lasing wavelength. Other coatings types are also possible for these elements.

The laser performance of a Tm/Ho:YAG laser has been calculated by the inventor. More particularly, it is been calculated that a laser using a Tm (2%) clad, Ho(10%) core composite laser gain medium of 25 mm in length and of Tm cross sectional dimensions of 1 mm by 2 mm with a Ho core of 400 μm by 400 μm will operate with a 40% optical-to-optical conversion efficiency (conversion of 785 nm pump light to 2.1 μm laser output), using a 80% reflectivity outcoupler at the lasing wavelength of 2.1 μm. Also, the laser performance of a Tm/Ho silca fiber laser has been calculated. It has been determined that a laser using a Tm(0.4 wt %) clad, Ho(1.4 wt %) core composite laser gain medium of 25 mm in length and of Tm cross sectional dimensions of 0.5 mm by 0.5 mm with a Ho core of 150 μm by 150 μm will operate with a 30% optical-to-optical conversion efficiency (conversion of 785 nm pump light to 2.1 μm laser output), using a 50% reflectivity outcoupler at the lasing wavelength of 2.1 μm.

Figure 9:
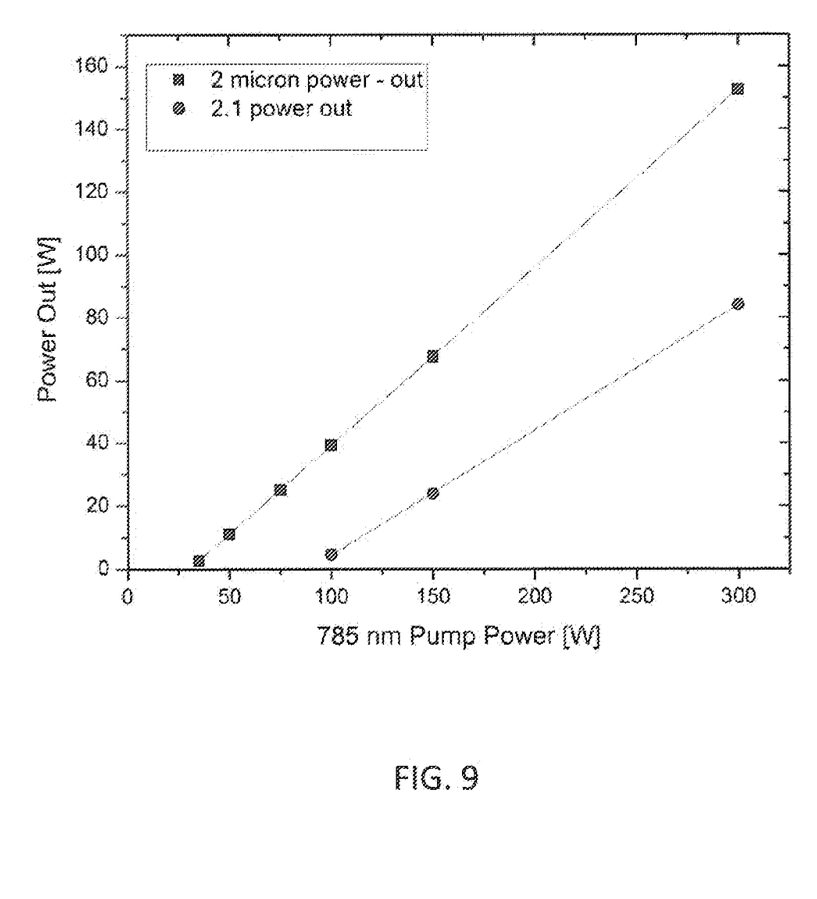
FIG. 9 is a plot showing the expected performance of one embodiment.

FIG. 9 is a plot showing the expected performance of a $1\times3\times50$ mm$^3$ Tm(1.5%)/Ho(5%): YAG slab according to an embodiment. It is expected that if 200 W of 785 nm pump is injected into the slab, 40 W of 2.1 μm laser single mode power will be emitted if bulk mirrors are used to define the laser mode.

The term "light," as used herein, refers to electromagnetic radiation having wavelengths in the infrared, visible and/or ultraviolet spectra. Some embodiments disclosed herein may use light in the infrared spectra, with wavelengths ranging from about 700 nm to 1 μm. However, it should be appreciated that other embodiments may be capable of using various wavelengths of light.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

I claim:

1. A composite laser gain medium comprising:
a first rare-earth element doped core; and
a second rare-earth element doped cladding, at least partially, adjacent to the core,
wherein a portion of the lasing by the cladding at one wavelength within the composite laser gain medium is absorbed by the core so as to cause lasing of the core at a different wavelength,
wherein
the core is doped with holmium (Ho) and the cladding is doped with thulium (Tm), or
the core is doped with erbium (Er) and the cladding is doped with ytterbium (Yb).

2. The composite laser gain medium of claim 1, wherein the composite laser gain medium has a substantially uniform cross-section along its length.

3. The composite laser gain medium of claim 2, wherein the laser composite gain medium is configured as a slab, or a cylindrical geometry.

4. The composite laser gain medium of claim 1, wherein, in its cross-section, the cladding fully surrounds the core along its length.

5. The composite laser gain medium of claim 1, wherein, in its cross-section, the cladding is adjacent to the core along its length on at least two sides thereof.

6. The composite laser gain medium of claim 1, further comprises an optical coating, wherein, in its cross-section, the cladding is adjacent to one side of the core and the optical coating is adjacent to an opposite side of the core.

7. The composite laser gain medium of claim 1, wherein the core is in direct contact, at least partially, with the cladding.

8. The composite laser gain medium of claim 1, further comprising at least one optical coating formed on an end surface of the composite laser gain medium which is orientated perpendicular to the core and cladding.

9. The composite laser gain medium of claim 1, further comprising at least one optical coating formed on a side surface the composite laser gain medium which is orientated parallel to the core and cladding.

10. A laser comprising the composite laser gain medium of claim 1.

11. The laser of claim 10, further comprising:
at least one source to output light to be received by the composite laser gain medium.

12. The laser of claim 11, further comprising: at least one lens to focus the light output from the at least one source onto the composite laser gain medium.

13. The laser of claim 10, further comprising at least one optical coating formed on one or both of the opposed end surfaces the composite laser gain medium orientated perpendicular to the core and cladding of the composite laser gain medium.

14. The laser of claim 10, further comprising at least one mirror positioned exterior to an end surface of the composite laser gain medium.

15. The laser of claim 10, wherein the laser is configured for:
(a) optical side pumping; or
(b) optical end pumping.

16. An optical amplifier comprising the composite laser gain medium of claim 1.

17. An optical waveguide comprising the composite laser gain medium of claim 1.

18. The waveguide of claim 17, wherein (a) the core is used as the waveguide; (b) a mirror is provided external to one end surface of the composite laser gain medium; or (c) a pair of mirrors is provided, one of said pair being provided external to each end surfaces of the composite laser gain medium.

19. A composite laser gain medium comprising:
a first rare-earth element doped core;
a second rare-earth element doped cladding, at least partially, adjacent to the core;
and
an optical coating, wherein, in its cross-section, the cladding is adjacent to one side of the core and the optical coating is adjacent to an opposite side of the core,
wherein a portion of the lasing by the cladding at one wavelength within the composite laser gain medium is absorbed by the core so as to cause lasing of the core at a different wavelength.

* * * * *